United States Patent
Yang et al.

(10) Patent No.: US 11,968,273 B2
(45) Date of Patent: Apr. 23, 2024

(54) METHODS AND APPARATUSES FOR SERVICE DISCOVERY

(71) Applicant: Telefonaktiebolaget LM Ericsson (publ), Stockholm (SE)

(72) Inventors: Yong Yang, Kållered (SE); Jesus Angel De-Gregorio-Rodriguez, Madrid (ES); Yunjie Lu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/598,810

(22) PCT Filed: Jan. 15, 2020

(86) PCT No.: PCT/CN2020/072247
§ 371 (c)(1),
(2) Date: Sep. 27, 2021

(87) PCT Pub. No.: WO2020/192254
PCT Pub. Date: Oct. 1, 2020

(65) Prior Publication Data
US 2022/0191294 A1 Jun. 16, 2022

(30) Foreign Application Priority Data
Mar. 28, 2019 (WO) ................ PCT/CN2019/080075

(51) Int. Cl.
*H04L 67/51* (2022.01)
*H04L 67/30* (2022.01)

(52) U.S. Cl.
CPC .............. *H04L 67/51* (2022.05); *H04L 67/30* (2013.01)

(58) Field of Classification Search
CPC ..... H04W 48/16; H04W 60/00; H04W 48/18; H04L 67/51; H04L 67/10; H04L 41/5058; H04L 67/30; H04L 67/02; H04L 41/50
See application file for complete search history.

(56) References Cited

U.S. PATENT DOCUMENTS 10,609,530 B1 * 3/2020 Patil ................. H04L 41/122
2017/0303259 A1 10/2017 Lee et al.
(Continued)

FOREIGN PATENT DOCUMENTS

| CN | 109314887 A | 2/2019 |
| CN | 109417492 A | 3/2019 |

(Continued)

OTHER PUBLICATIONS

International Search Report and Written Opinion dated Apr. 13, 2020 in International Application No. PCT/CN2020/072247 (7 pages total).
(Continued)

*Primary Examiner* — Tonia L Dollinger
*Assistant Examiner* — Mehulkumar J Shah
(74) *Attorney, Agent, or Firm* — Rothwell, Figg, Ernst & Manbeck, P.C.

(57) ABSTRACT

In one aspect, an NRF is configured to inform an NF instance that has sent a discover request toward the NRF that the number of NF instances that match the search criteria used by the NRF in response to the discover request is greater than the number of NF instance profiles included in the NF instances array of the discover response.

22 Claims, 7 Drawing Sheets

(56) References Cited

U.S. PATENT DOCUMENTS

| | | | |
|---|---|---|---|
| 2017/0332421 A1 | 11/2017 | Sternberg et al. | |
| 2018/0227871 A1 | 8/2018 | Singh et al. | |
| 2018/0367980 A1 | 12/2018 | Lee et al. | |
| 2019/0045037 A1* | 2/2019 | Sukhomlinov | H04L 12/4641 |
| 2019/0053147 A1* | 2/2019 | Qiao | H04M 15/8038 |
| 2019/0166001 A1* | 5/2019 | Ma | H04L 41/0895 |
| 2020/0137174 A1* | 4/2020 | Stammers | H04L 67/141 |
| 2021/0377754 A1* | 12/2021 | Marquezan | H04W 24/02 |
| 2022/0159433 A1* | 5/2022 | Flinck | H04W 12/06 |

FOREIGN PATENT DOCUMENTS

| | | |
|---|---|---|
| CO | 15141586 A1 | 11/2015 |
| RU | 2 636 655 C2 | 11/2017 |
| TW | 201831038 A | 8/2018 |
| WO | 2018/023338 A1 | 2/2018 |
| WO | 2018067780 A1 | 4/2018 |
| WO | 2018/093168 A1 | 5/2018 |
| WO | 2018/199649 A1 | 11/2018 |

OTHER PUBLICATIONS

3GPP TR 23.742 V1.0.0, 3rd Generation Partnership Project; Technical Specification Group Services and System Aspects; Study on Enhancements to the Service-Based Architecture (Release 16), Sep. 2018 (101 pages total).
Samsung, "Proposal for use of CAPIF for eSBA Framework", SA WG2 Meeting #128-bis, S2-187902, Aug. 20-24, 2018, Sophia Antipolis, France (9 pages total).
3GPP TS 29.510 V15.3.0, 3rd Generation Partnership Project; Technical Specification Group Core Network and Terminals; 5G System; Network Function Repository Services; Stage 3 (Release 15), Mar. 24, 2019, Sophia Antipolis, France, XP051722833 (115 pages total).
3GPP TS 23.502 V15.5.0, 3rd Generation Partnership Project; Technical Specification Group Services and System Aspects; Procedures for the 5G System; Stage 2 (Release 15), Mar. 25, 2019, Sophia Antipolis, France, XP051722866 (355 pages total).
Nokia et al., "Limiting the number of NFProfiles returned in NFDiscover response", 3GPP TSG-CT WG4 Meeting #89, C4-190444, Montreal, Canada; Feb. 25-Mar. 1, 2019, XP051684671 (9 pages total).
Nokia et al., "Maximum payload size of NFDiscover Response", 3GPP TSG-CT WG4 Meeting #89, C4-190611, Montreal, Canada; Feb. 25-Mar. 1, 2019, XP051684672 (10 pages total).
Ericsson, "Number of NF Instances", 3GPP TSG-CT WG4 Meeting #90, C4-191195, Xi'an, P.R. China, Apr. 8-12, 2019, XP051689748 (2 pages total).
Ericsson, "Number of NF Instances", 3GPP TSG-CT WG4 Meeting #91, C4-192314 (was C4-192195), Reno, US, May 13-17, 2019, XP051745253 (9 pages total).
3GPP TS 29.510 V15.1.0 (Sep. 2018), 3rd Generation Partnership Project; Technical Specification Group Core Network and Terminals; 5G System; Network Function Repository Services; Stage 3 (Release 15), Sep. 2018, Sophia Antipolis, France (84 pages).
3GPP TS 29.510 V15.1.0 (Aug. 2018), 3rd Generation Partnership Project; Technical Specification Group Core Network and Terminals; 5G System; Network Function Repository Services; Stage 3 (Release 15), Aug. 2018, Sophia Antipolis, France (84 pages).

* cited by examiner

METHODS AND APPARATUSES FOR SERVICE DISCOVERY

CROSS REFERENCE TO RELATED APPLICATION(S)

This application is a 35 U.S.C. § 371 National Stage of International Patent Application No. PCT/CN2020/072247, filed Jan. 15, 2020, and claiming priority to International Patent application no. PCT/CN2019/080075, filed on Mar. 28, 2019. The above identified applications are incorporated by reference.

TECHNICAL FIELD

Disclosed are embodiments related to service discovery.

BACKGROUND

FIG. 1 illustrates a reference point representation of an exemplifying wireless communication system 100 represented as a 5G network architecture comprising an Access Network (AN) (e.g., a Radio AN (R(AN)) and a Core network (CN) comprising Network Functions (NFs). Typically, the AN comprises base stations, e.g. such as evolved Node Bs (eNBs) or 5G base stations (gNBs) or similar. As shown in FIG. 1, User Equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

The reference point representations of the 5G network architecture are used to develop detailed call flows in the normative standardization. The N1 reference point is defined to carry signaling between UE and AMF. The N2 and N3 reference points are defined to carry signaling between R(AN) and AMF and between R(AN) and UPF respectively. The N11 reference point is defined to carry signaling between AMF and SMF. The N4 reference point is defined to carry signaling between SMF and UPF. The N9 reference point is defined to carry signaling between different UPFs and the N14 reference point is defined to carry signaling between different AMFs. The reference points N15 and N7 are defined to carry signaling between PCF and AMF and SMF respectively. The N12 reference point is defined to carry signaling between AMF and AUSF. The N8 and N10 reference points are defined to carry signaling between UDM and AMF and SMF respectively. The N13 reference point is defined to carry signaling between AUSF and UDM. The N22 reference point is defined to carry signaling between NSSF and AMF.

The 5G core network aims at separating user plane and control plane. The user plane carries user traffic (e.g. user data) while the control plane carries signaling in the network. In FIG. 1, the UPF is in the user plane while the other NFs, i.e., AMF, SMF, PCF, AF, AUSF, and UDM, are in the control plane. Separating the user plane and the control plane allows the resources in each plane to be scaled independently. It also allows UPFs to be deployed separately from control plane functions in a distributed fashion. For example, an UPF may be deployed very close to UEs to shorten the Round Trip Time (RTT) between UEs and data network for some applications requiring low latency.

The NFs in the 5G core network architecture are independent modularized functions, which allows independent evolution and scaling. Modularized function design enables the 5G core network to support various services in a flexible manner Each NF in the core network interacts with another NF directly, but it is possible to use intermediate functions to route messages from one NF to another NF.

FIG. 2 illustrates an exemplifying wireless communication system 200 represented as a 5G network architecture that uses service-based interfaces (SBIs) between the NFs in the control plane, instead of the point-to-point reference points/interfaces used in the 5G network architecture of FIG. 1. The NFs described above with reference to FIG. 1 correspond to the NFs shown in FIG. 2. The service(s) etc. that a NF provides to other authorized NFs can be exposed to the authorized NFs through the SBI. In FIG. 2 the SBIs are indicated by the letter "N" followed by the name of the NF, e.g. Namf for the SBI of the AMF and Nsmf for the SBI of the SMF etc. The Network Exposure Function (NEF) and the NF Repository Function (NRF) in FIG. 2 are not shown in FIG. 1 discussed above. However, it should be clarified that all NFs depicted in FIG. 1 can interact with the NEF and the NRF of FIG. 2 as required, though not explicitly indicated in FIG. 1. A main difference between the point-to-point architecture in FIG. 1 and the service-based architecture in FIG. 2 is that the service-based architecture doesn't us predefined point to point interfaces between the NFs. Instead, a NF in the service-based architecture queries the NRF to discover and communicate with other NFs via the SBIs.

Some properties of the NFs shown in FIG. 1 and FIG. 2 may be described in the following manner The AMF provides UE-based authentication, authorization and mobility management, etc. A UE even if using multiple access technologies is basically connected to a single AMF, since the AMF is independent of the access technologies. The SMF is responsible for session management and allocates IP addresses to UEs and selects and controls the UPF for data transfer with respect to the UEs. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs and thus stores data for authentication of UEs or similar while UDM stores subscription data of UEs. The Data Network (DN), not part of the 5G core network, provides Internet access or operator services and similar.

The NRF supports the following functionality: 1) maintains the NF profile of available NF instances and their supported services; 2) allows other NF instances to subscribe to, and get notified about, the registration in NRF of new NF instances of a given type; and 3) supports service discovery function. It receives NF Discover requests from NF instances, and provides the information of the available NF instances fulfilling certain criteria (e.g., supporting a given service). Features of the NRF are specified in 3GPP Technical Specification (TS) 29.501 v15.n.0 (n=1, 2, 3).

An NF may be implemented either as a network element on a dedicated hardware, as a software instance running on a dedicated hardware, or as a virtualized function instantiated on an appropriate platform, e.g., a cloud infrastructure.

A number of 5G core network NFs of different types are always instantiated per default in the 5G core network, e.g. such as an AMF, a NRF, a PCF and a SMF etc. Other 5G core network NFs may be instantiated as needed and several NFs of the same type can also be instantiated if required, e.g. to distribute load to additional NF(s) of the same type. Thus, a NF instance may be seen as an example or a specimen of a certain NF. Similarly, NF service instance may be seen as an example or a specimen of a certain NF service. Herein, the terms NF and NF instance are used interchangeably and also the terms NF service and NF service instance are used interchangeably, unless otherwise expressly stated or is apparent from the context in which the terms are used.

FIG. 3 is a message flow diagram illustrating an example of the network function service framework in the service based 5G core network. Among other things, the framework comprises: 1) a NF service registration procedure and 2) a NF service discovery and authorization procedure.

Registration Procedure

A core network NF instance in the service based 5G core network registers its NF profile at the NRF. Thus, NF1 (e.g. a AMF) sends a Registration Request to the NRF in action 300a, which request comprises the NF profile of the registering NF1. The NF profile is typically included in the request as a JavaScript Object Notation (JSON) object or similar. The NF profile indicates the NF service(s) that is supported by the registering NF instance. In this example it is assumed that the registering NF1 supports a NF service labeled NF service A. Generally, a NF profile may comprise one or more of the following items for the registering NF: NF type, Fully Qualified Domain Name (FQDN) or IP address, Name(s) of supported service(s), Endpoint information of instance(s) of each supported service and possibly other service parameter. In action 300b the NRF stores the NF profile of the registering NF1 and preferably marks the NF instance (i.e. NF1) as available. The NRF may then send a Registration Response to NF1 in action 300c, which response may include the registered NF profile as a confirmation of the registration made by the NRF.

The registration may take place when the NF instance becomes operative for the first time or upon an activation of an individual NF service within the NF instance, e.g. triggered after a scaling operation. The NF instance may register/expose one or more NF services. The information registered for an individual NF service may e.g. indicate security related information to be used for authorizing a discovering NF instance, e.g. security information that indicates the NFs that are allowed to discover the individual NF service, e.g. the type of NFs or the particular NFs of a certain type that are allowed to discover the NF service in question. However, known art NFs that does not produce/support any NF service will not register any service at the NRF. Thus, an NF instance that only consumes one or more NF services will not register anything at the NRF.

Discovery and Authorization

When a NF instance in the service based 5G core network intends to consume a NF service supported by another NF instance it will initiate a NF service discovery procedure with the NRF for the NF service in question. Thus, NF2 (e.g. a SMF) sends a Discover request to the NRF in action 302a, which request comprises discovery information. The discovery information may be included in the request as a JSON object (e.g., file) or similar. The discovery information indicates the expected service to be consumed by the discovering NF (e.g. NF service A mentioned above). Preferably, the discovery information indicates the service name or similar of the expected NF service. Additionally or alternatively, the discovery information may indicate one or more of: the NF type of the expected NF (i.e. the type of NF that is expected to produce the expected NF service) and/or the NF type of the discovering NF. Generally, the NF type may e.g. be any of NSSF, NEF, AUSF, AMF, PCF, SMF, UDM or AF or similar, unless the context in which the NF type is mentioned indicates otherwise.

The NRF authorizes the discover request by determining—based on the discovery information provided in the discover request and preferably also based on the profile registered by relevant expected target NF instance(s)—whether the discovering NF (i.e. the potential service consumer) is authorized to discover the expected NF service and/or NF instance(s) expected to produce the expected service. The discovery and authorization by the NRF is exemplified by action 302b in FIG. 3, wherein the expected target NF instance is NF1 and the potential service consumer is NF2.

For example, if the expected NF instance(s) or NF service instance(s) are deployed in a certain network slice, the NRF may authorize the discover request according to the discovery configuration of the Network Slice, e.g. the expected NF instance(s) may only be discoverable by the NF in the same network slice etc.

When authorized, the NRF determines a set of one or more discovered NF instance(s) and/or NF service instance(s) that supports the expected service and sends a Discover request Response to the requester NF (service consumer). Thus, the NRF sends a Discover request Response to NF2 in action 302c, which response comprises repository information indicating one or more discovered NF instance(s) and/or NF service instance(s) that supports the expected service, i.e. that can produce the expected service. The repository information may e.g. indicate one or more of: FQDN, IP address and/or endpoint addresses (e.g. Uniform Resource Locators (URLs) or similar) for said one or more discovered NF instance(s) and/or NF service instance(s).

SUMMARY

It has been proposed that during a service discovery procedure a service consumer can include some parameters to trim the discover response from the NRF. See, for example: 1) Change Request (CR) 0126 29.510 Rel-15, C4-190444 (Limiting the number of NFProfiles returned in NFDiscover response); and 2) CR 0127 29.510 Rel-15, C4-190611 (Maximum payload size of NFDiscover Response). CR 0126 proposes to extend the NFDiscover request with an optional query parameter ("limit") defining the maximum number of NFProfiles to be returned in the query; and CR 0127 proposes a new query parameter ("max-payload-size") to enable a NRF client to indicate to the NRF the maximum payload size it expects for the HTTP response (e.g. based on data store, cache or HTTP message payload limits it can support). This allows the NRF to limit the number of NF Profiles it returns in the response such as to not exceed the maximum payload size indicated by the NRF client.

Certain challenges, however, exist. For example, by introducing the above two query parameters ("limit" and "max-payload-size"), it is possible that the NRF will fail to return a complete list of candidate NFs. In addition, during a service discovery procedure, a requester NF (service consumer) may provide to many query parameters, which may lead to the NRF being unable to return any candidate NF service producers. Per the existing specification (TS29.510-v15.3.0), such request will be rejected. However, in most of those cases, the NRF could "guess" what are most important query parameters, thus it can find a number of candidates NF service producer if it omits some unimportant parameter. An example of such an unimportant parameter is the "preferred locality" parameter. This could happen especially for roaming scenarios, i.e. the discover request is relayed by a local NRF to an NRF in HPLMN. Likewise, if there are too few parameters in the request message, this could lead the NRF to include too many candidates NF service producers in the response message, even with max number NF profile and max payload size, which can limit the size of response message. However, such service discovery results may not be useful at all, e.g. can't be used for load sharing. Accordingly, the NRF may add a few extra parameters to reduce the number of NF candidates that match the query.

Given the above challenges, it would be advantageous for the NRF to inform a requestor NF (i.e., an NF instance that has sent a discover request toward the NRF) that the number of NF instances that match the search criteria used by the NRF in response to the discover request is greater than the number of NF instance profiles included in the nf instances array of the discover response (i.e., the search results have been trimmed by the NRF). It would also be advantageous to provide a mechanism to allow the requester NF to fetch the complete service discovery results when the results included in the service discover response message have been trimmed by the NRF. Additionally, in situations where the NRF performs a search using a subset or a superset of the query parameters that were included in the discover request, it would also be advantageous for the NRF to inform the requestor NF of the set of query parameters that were used by the NRF to produce the response.

Accordingly, this disclosure proposes that a discover request response transmitted by the NRF in response to an NF discover request (a.k.a., service discover request) may include additional information, and this additional information comprises any combination of one or more of the following: 1) the set of query parameters used by the NRF to produce the response (this set may be a subset or a superset of the query parameters that were included in the discover request); 2) a value declaring the total number of NF instances that match the search criteria used by the NRF in response to the discover request; and 3) an object identifier (e.g., URI) that the requestor NF can use to obtain an object (a.k.a., data structure) that contains, at the least, the NF instance profiles that match the search criteria but that were not included in the discover response. For example, the URI can point to an object that contains each NF instance profile that matches the search criteria (or each NF instance profile that matches the search criteria but that was not included in the discover response). The additional information may also include object expiration information specifying a time at which the object identifier expires (e.g., the time at which the object identified by the object identifier is deleted from storage or otherwise now longer available to be retrieved). This mechanism allows the NRF to provide a more useful discover response.

Thus, in one aspect there is provided a method for providing a service discovery service to a network function, NF, instance. The method includes a network repository function, NRF, receiving a discover request transmitted by the NF instance, wherein the discover request comprises a set of one or more query parameters. The method also includes the NRF transmitting, based on a search criteria based on query parameters included in the discover request, a discover response that comprises an array of zero or more NF instance profiles, wherein each NF instance profile, if any, included in the array is an NF instance profile that matches the search criteria. The discover response further comprises any combination of one or more of the following: 1) the query parameters of the search criteria used by the NRF to search for and identify the NF instance profiles that match the search criteria; 2) a value specifying the total number of NF instance profiles that match the search criteria; and 3) an object identifier that the NF instance can use to obtain NF instance profiles that match the search criteria but were not included in the discover response to the NF instance.

In another aspect there is provided a method for discovering services. The method includes a NF instance transmitting a discover request towards a NRF. The request comprises query parameters. The NRF is configured to use a search criteria comprising a subset or a superset of the query parameters to search for and identify NF instance profiles that match the search criteria. The method also includes the NF instance receiving a discover response transmitted by the NRF in response to the request. The discover response comprises zero or more NF instance profiles and further comprises any combination of one or more of the following: 1) the query parameters of the search criteria used by the NRF to search for and identify the NF instance profiles that match the search criteria; 2) a value specifying the total number of NF instance profiles that the NRF has determined match the search criteria; and 3) an object identifier for obtaining an object that comprises NF instance profiles that match the search criteria but that were not included in the discover response.

BRIEF DESCRIPTION OF THE DRAWINGS

The accompanying drawings, which are incorporated herein and form part of the specification, illustrate various embodiments.

DETAILED DESCRIPTION

Figure 1:
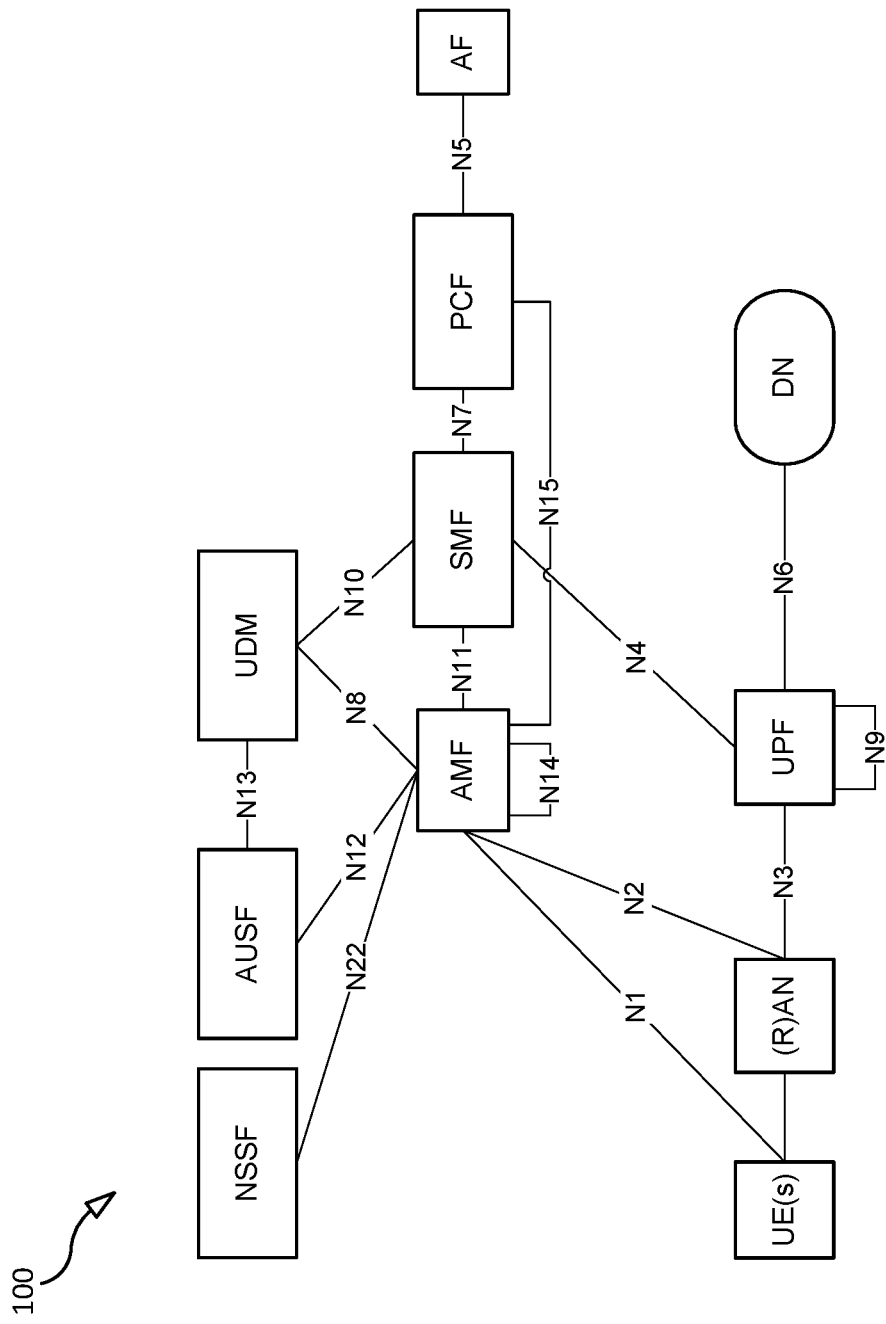
FIG. 1 illustrates a wireless communication system represented as a 5G network architecture composed of NFs using point to point reference points or interfaces.
Figure 2:
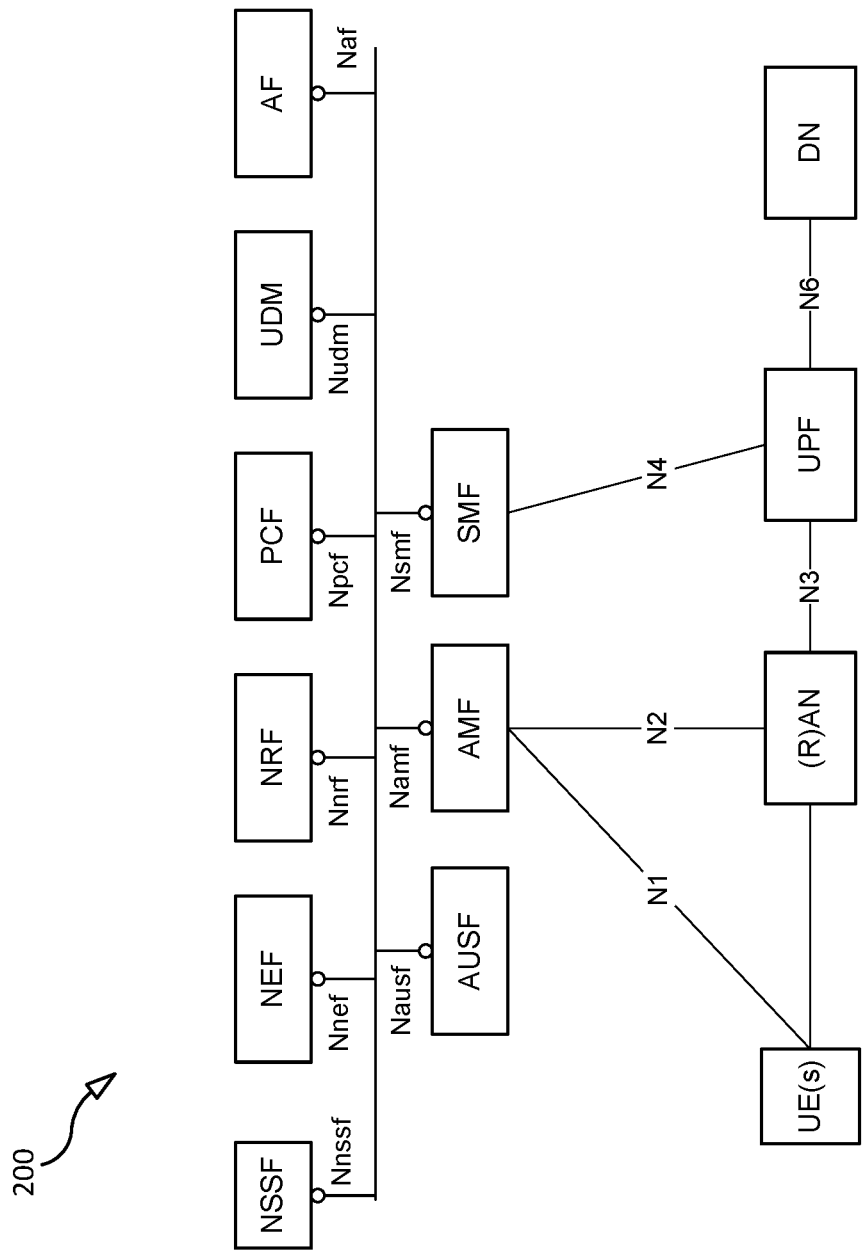
FIG. 2 illustrates a 5G network architecture using service-based interfaces (SBIs) between the NFs in the control plane, instead of the point-to-point reference points/interfaces used in the 5G network architecture of FIG. 1.
Figure 3:
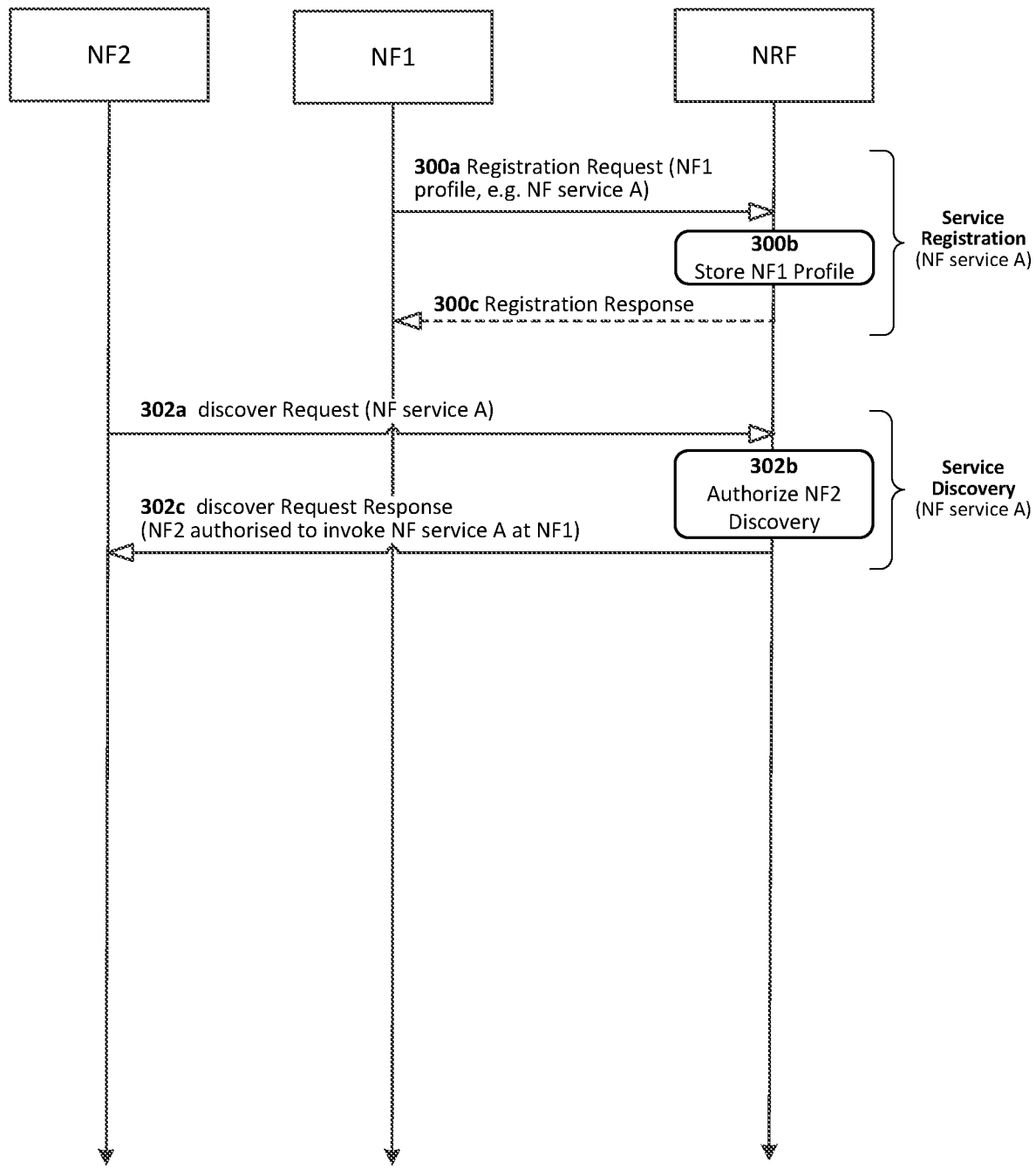
FIG. 3 is a message flow diagram illustrating an example of the network function service framework in the service based 5G core network.
Figure 4:
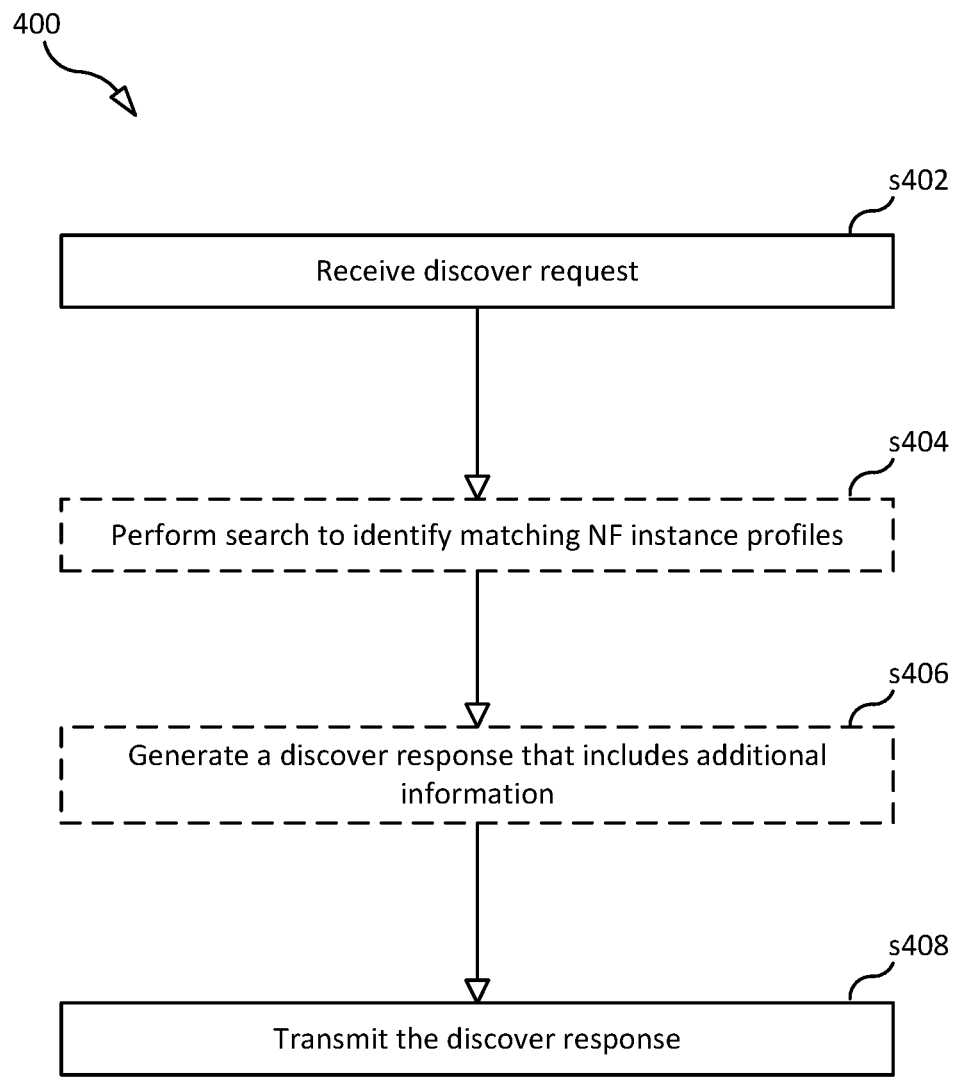
FIG. 4 is a flowchart illustrating a process according to an embodiment.

FIG. 4 is a flowchart illustrating a process 400 according to an embodiment. Process 400 may begin in step s402.

Figure 5:
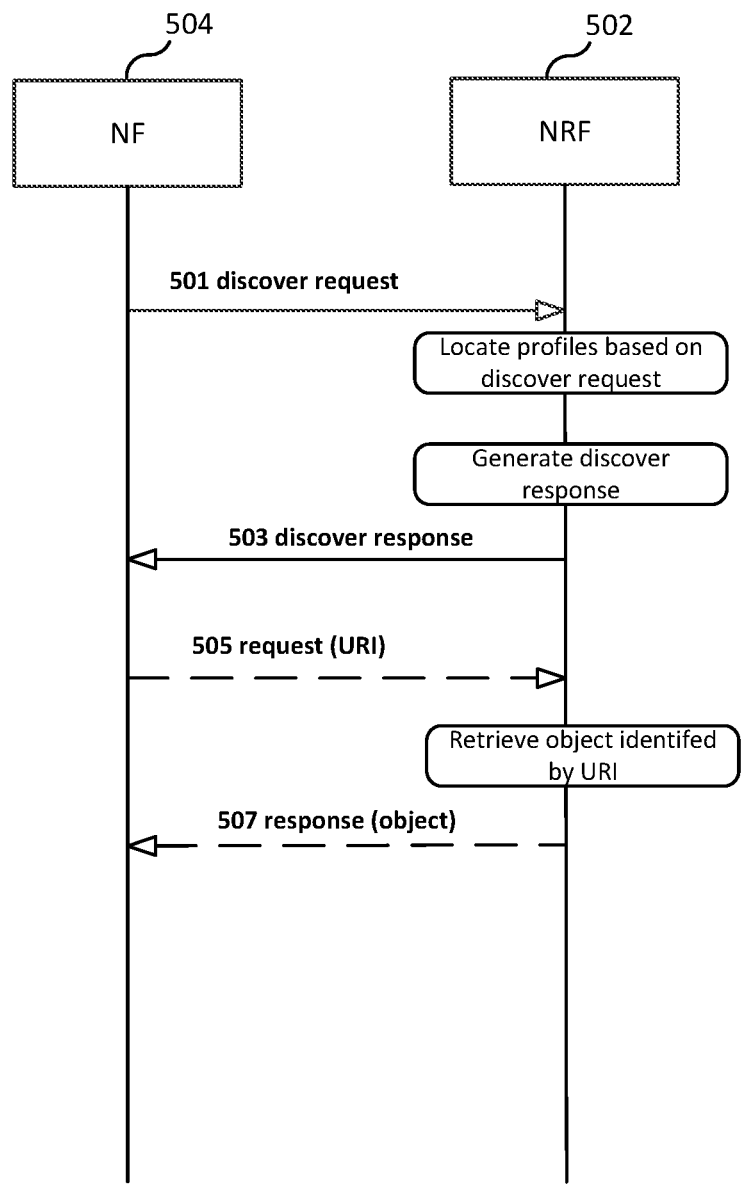
FIG. 5 is a message flow diagram illustrating an embodiment.

Step s402 comprises an NRF 502 (see FIG. 5) receiving a discover request 501 transmitted by an NF instance 504 (a.k.a., requestor NF 504), where the discover request comprises a set of one or more query parameters. The discover request 501 may be a Hypertext Transfer Protocol (HTTP) GET request that comprises the set of query parameters (the GET request may also include the string "nnrf-disc" or other value to indicate to the NRF that the requestor NF 504 is invoking the Discovery Service procedure). In one embodiment, the query parameters that may be included in the GET request are described in table 6.2.3.2.3.1-1 of 3GPP TS 29.510 V15.3.0, which is reproduced below in Table 1:

TABLE 1

| Name | Data type | P | Cardinality | Description | Applicability |
|---|---|---|---|---|---|
| target-nf-type | NFType | M | 1 | This IE shall contain the NF type of the NF Service Producer being discovered. | |
| requester-nf-type | NFType | M | 1 | This IE shall contain the NF type of the NF Service Consumer that is invoking the Nnrf_NFDiscovery service. | |
| service-names | array(ServiceName) | O | 1 . . . N | If included, this IE shall contain an array of service names for which the NRF is queried to provide the list of NF profiles. The NRF shall return the NF profiles that have at least one NF service matching the NF service names in this list. The NF service names returned by the NRF shall be an intersection of the NF service names requested and the NF service names registered in the NF profile. If not included, the NRF shall return all the NF service names registered in the NF profile. | |
| requester-nf-instance-fqdn | Fqdn | O | 0 . . . 1 | If included, this IE shall contain the FQDN of the NF Service Consumer that is invoking the Nnrf_NFDiscovery service. The NRF shall use this to return only those NF profiles that include at least one NF service containing an entry in the "allowedNfDomains" list (see subclause 6.1.6.2.3) that matches the domain of the requester NF. | |
| target-plmn-list | array(PlmnId) | C | 1 . . . N | This IE shall be included when NF services in a different PLMN, or NF services of specific PLMN ID(s) in a same PLMN comprising multiple PLMN IDs, need to be discovered. When included, this IE shall contain the PLMN ID of the target NF. If more than one PLMN ID is included, NFs from any PLMN ID present in the list matches the query parameter. | |
| requester-plmn-list | array(PlmnId) | C | 1 . . . N | This IE shall be included when NF services in a different PLMN need to be discovered. When included, this IE shall contain the PLMN ID(s) of the requester NF. | |
| target-nf-instance-id | NfInstanceId | O | 0 . . . 1 | Identity of the NF instance being discovered. | |
| target-nf-fqdn | Fqdn | O | 0 . . . 1 | FQDN of the target NF instance being discovered. | |
| hnrf-uri | Uri | C | 0 . . . 1 | If included, this IE shall contain the API URI of the NFDiscovery Service (see subclause 6.2.1) of the home NRF. It shall be included if the NF Service Consumer has previously received such API URI to be used for service discovery (e.g., from the NSSF in the home PLMN). | |
| snssais | array(Snssai) | O | 1 . . . N | If included, this IE shall contain the list of S-NSSAI that are served by the services being discovered. The NRF shall use this to identify the NF services that have registered their support for these S-NSSAIs. The NRF shall return the NF profiles that have at least one S-NSSAI matching the S-NSSAIs in this list. The S-NSSAIs included in the NF profile returned by the NRF shall be an intersection of the S-NSSAIs requested and the S-NSSAIs registered in the NF profile. | |
| plmn-specific-snssai-list | array(PlmnSnssai) | O | 1 . . . N | If included, this IE shall contain the list of S-NSSAI that are served by the NF service being discovered for the corresponding PLMN provided. The NRF shall use this to identify the NF services that have registered their support for the S-NSSAIs for the corresponding PLMN given. The NRF shall return the NF profiles that have at least one per PLMN S-NSSAI entry matching the PLMN specific S-NSSAIs provided in this list. The per PLMN list of S-NSSAIs included in the NF profile returned by the NRF shall be an intersection of the list requested and the list registered in the NF profile. | |
| nsi-list | array(string) | O | 1 . . . N | If included, this IE shall contain the list of NSI IDs that are served by the services being discovered. | |
| dnn | Dnn | O | 0 . . . 1 | If included, this IE shall contain the DNN for which NF services serving that DNN is discovered. DNN may be included if the target NF type is "BSF", "SMF" or "UPF". If the Snssai(s) are also included, the NF services serving the DNN shall be available in the network slice(s) identified by the Snssai(s). | |
| smf-serving-area | string | O | 0 . . . 1 | If included, this IE shall contain the serving area of the SMF. It may be included if the target NF type is "UPF". | |
| tai | Tai | O | 0 . . . 1 | Tracking Area Identity. | |

TABLE 1-continued

| Name | Data type | P | Cardinality | Description | Applicability |
|---|---|---|---|---|---|
| amf-region-id | AmfRegionId | O | 0 . . . 1 | AMF Region Identity. | |
| amf-set-id | AmfSetId | O | 0 . . . 1 | AMF Set Identity. | |
| guami | Guami | O | 0 . . . 1 | Guami used to search for an appropriate AMF. (NOTE 1) | |
| supi | Supi | O | 0 . . . 1 | If included, this IE shall contain the SUPI of the requester UE to search for an appropriate NF. SUPI may be included if the target NF type is e.g. "PCF", "CHF", "AUSF", "UDM" or "UDR". | |
| ue-ipv4-address | Ipv4Addr | O | 0 . . . 1 | The IPv4 address of the UE for which a BSF needs to be discovered. | |
| ip-domain | string | O | 0 . . . 1 | The IPv4 address domain of the UE for which a BSF needs to be discovered. | |
| ue-ipv6-prefix | Ipv6Prefix | O | 0 . . . 1 | The IPv6 prefix of the UE for which a BSF needs to be discovered. | |
| pgw-ind | boolean | O | 0 . . . 1 | When present, this IE indicates whether a combined SMF/PGW-C or a standalone SMF needs to be discovered. true: A combined SMF/PGW-C is requested to be discovered; false: A standalone SMF is requested to be discovered. (See NOTE 2) | |
| pgw | Fqdn | O | 0 . . . 1 | If included, this IE shall contain the PGW FQDN which is received by the AMF from the MME to find the combined SMF/PGW. | |
| gpsi | Gpsi | O | 0 . . . 1 | If included, this IE shall contain the GPSI of the requester UE to search for an appropriate NF. GPSI may be included if the target NF type is "CHF", "UDM" or "UDR". | |
| external-group-identity | GroupId | O | 0 . . . 1 | If included, this IE shall contain the external group identifier of the requester UE to search for an appropriate NF. This may be included if the target NF type is "UDM" or "UDR". | |
| data-set | DataSetId | O | 0 . . . 1 | Indicates the data set to be supported by the NF to be discovered. May be included if the target NF type is "UDR". | |
| routing-indicator | string | O | 0 . . . 1 | Routing Indicator information that allows to route network signalling with SUCI (see 3GPP TS 23.003 [12]) to an AUSF and UDM instance capable to serve the subscriber. May be included if the target NF type is "AUSF" or "UDM". | |
| group-id-list | array(NfGroupId) | O | 1 . . . N | Identity of the group(s) of the NFs of the target NF type to be discovered. May be included if the target NF type is "UDR", "UDM" or "AUSF". | |
| dnai-list | array(Dnai) | O | 1 . . . N | If included, this IE shall contain the Data network access identifiers. It may be included if the target NF type is "UPF". | |
| upf-iwk-eps-ind | boolean | O | 0 . . . 1 | When present, this IE indicates whether a UPF supporting interworking with EPS needs to be discovered. true: A UPF supporting interworking with EPS is requested to be discovered; false: A UPF not supporting interworking with EPS is requested to be discovered. (NOTE 3) | |
| chf-supported-plmn | PlmnId | O | 0 . . . 1 | If included, this IE shall contain the PLMN ID that a CHF supports (i.e., in the PlmnRange of ChfInfo attribute in the NFProfile). This IE may be included when the target NF type is "CHF". | |
| preferred-locality | string | O | 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. | |
| access-type | AccessType | C | 0 . . . 1 | If included, this IE shall contain the Access type which is required to be supported by the target Network Function (i.e. SMF). | |
| supported-features | SupportedFeatures | O | 0 . . . 1 | List of features required to be supported by the target Network Function. This IE may be present only if the service-names attribute is present and if it contains a single service-name, or if the target Network Function does not support any service. It shall be ignored by the NRF otherwise. (NOTE 4) | |
| required-features | array(SupportedFeatures) | O | 1 . . . N | List of features required to be supported by the target Network Function, as defined by the SupportedFeatures attribute in NFService (see subclauses 6.1.6.2.3 and 6.2.6.2.4). This IE may be present only if the service-names attribute is present. When present, the required-features attribute shall contain as many entries as the number of entries in the service-names attribute. The $n^{th}$ entry in the required-features attribute shall correspond to the $n^{th}$ entry in the service-names attribute. An entry corresponding to a service for which no specific feature is required shall be encoded as "0". | Query-Params-Ext1 |

TABLE 1-continued

| Name | Data type | P | Cardinality | Description | Applicability |
|---|---|---|---|---|---|
| complex-query | ComplexQuery | O | 0 . . . 1 | This query parameter is used to override the default logical relationship of query parameters. | Complex-Query |
| limit | integer | O | 0 . . . 1 | Maximum number of NFProfiles to be returned in the response. | Query-Params-Ext1 |
| max-payload-size | integer | O | 0 . . . 1 | Maximum payload size (before compression, if any) of the response, expressed in kilo octets. When present, the NRF shall limit the number of NF profiles returned in the response such as to not exceed the maximum payload size indicated in the request. Default = 124. Maximum = 2000 (i.e. 2 Mo). | Query-Params-Ext1 |
| pdu-session-types | array(PduSessionType) | O | 1 . . . N | List of the PDU session type (s) requested to be supported by the target Network Function (i.e UPF). | Query-Params-Ext1 |

(NOTE 1):
If this parameter is present and no AMF supporting the requested GUAMI is available due to AMF Failure or planned AMF removal, the NRF shall return in the response AMF instances acting as a backup for AMF failure or planned AMF removal respectively for this GUAMI. The NRF can detect if an AMF has failed, using the Heartbeat procedure. The NRF will receive a de-registration request from an AMF performing a planned removal.
(NOTE 2):
If the combined SMF/PGW-C is requested to be discovered, the NRF shall return in the response the SMF instances registered with the SmfInfo containing pgwFqdn.
(NOTE 3):
If a UPF supporting interworking with EPS is requested to be discovered, the NRF shall return in the response the UPF instances registered with the upfInfo containing iwkEpsInd set to true.
(NOTE 4):
This attribute has a different semantic than what is defined in subclause 6.6.2 of 3GPP TS 29.500 [4], i.e. it is not used to signal optional features of the Nnrf_NFDiscovery Service API supported by the requester NF.

Step s404 (optional) comprises searching for NF instance profiles that match a search criteria based on the set of query parameters included in the discover request 501. The search criteria may be the same as the set of query parameters included in the discover request 501 or may be either a subset or a superset of the set of query parameters included in the discover request 501. Step s404 may be performed by NRF 502. That is the search criteria may consist of the set of query parameters included in the discover request 501, the search criteria may consist of a subset of the set of query parameters included in the discover request 501, or the search criteria may comprise the set of query parameters included in the discover request 501 in addition to one or more other query parameters.

Step s406 (optional) comprises generating a discover response 503 (e.g., HTTP GET response) (see FIG. 5) that comprises an array of zero or more NF instance profiles, wherein each NF instance profile, if any, included in the array is an NF instance profile that matches the search criteria. Step s404 may be performed by NRF 502. Discover response also includes additional information, which comprises any combination of one or more of the following: 1) the query parameters of the search criteria used by NRF 502 to search for and locate the NF instance profiles that match the search criteria (this set of query parameters may be a subset or a superset of the query parameters that were included in the discover request); 2) a value specifying the total number of NF instance profiles that match the search criteria; and 3) an object identifier (e.g., URI) that the requestor NF 504 can use to obtain an object that contains, at the least, the NF instance profiles that match the search criteria but not included in the discover response. The additional information may also include object expiration information specifying a time at which the object identifier expires (e.g., the time at which the object identified by the object identifier is deleted from storage or otherwise now longer available to be retrieved).

For instance, in one embodiment, the additional information comprises the value specifying the total number of NF instance profiles that match the search criteria but does not comprise the search criteria or the URI. In another embodiment, the additional information comprises the value specifying the total number of NF instance profiles that match the search criteria and the object identifier and the object expiration information. For example, the object identifier can point to a stored object that contains each NF instance profile that matches the search criteria (or each NF instance profile that matches the search criteria but was not included in the discover response 503). In some embodiments, the stored object is removed or marked as deleted at the time indicated by the object expiration information. In another embodiment, the additional information comprises all three of the above described items: the query parameters of the search criteria, the URI, and the value specifying the total number of NF instances matching the search criteria, as well as the object expiration information.

For example, in one embodiment, discovery response 503 includes a SearchResult data structure that comprises a set of attribute values and the set of attribute values may include the values described above as well as the array of profiles. For instance, in one embodiment, the SearchResult object may be defined as shown the table below:

TABLE 2

| Definition of Type SearchResult | | | | |
|---|---|---|---|---|
| Attribute name | Data type | P | Cardinality | Description |
| validityPeriod | integer | M | 1 | It shall contain the time in seconds during which the discovery result is considered valid and can be cached by the NF Service Consumer. This value shall be the same as the |

TABLE 2-continued

Definition of Type SearchResult

| Attribute name | Data type | P | Cardinality | Description |
|---|---|---|---|---|
| | | | | value contained in the "max-age" parameter of the "Cache-Control" header field sent in the HTTP response. |
| nfInstances | array(NFProfile) | M | 0 . . . N | It shall contain an array of NF Instance profiles, matching the search criteria indicated by the query parameters of the discovery request. An empty array means there is no NF instance that can match the search criteria. |
| foundNFInstances | integer | O | 0 . . . 1 | This IE may be present when the total number of NF Instances found by NRF, as the result of the service discovery process, is higher than the actual number of NF Instances included in the attribute nfInstances of the SearchResult object. This may happen due to the NF Service Consumer including in the discovery request parameters such as "limit" or "max-payload-size". |
| nrfSupportedFeatures | SupportedFeatures | C | 0 . . . 1 | Features supported by the NRF for the NFDiscovery service (see subclause 6.2.9). This IE should be present if the NRF supports at least one feature. |
| UsedQueryParameters | array(queryparameters) | O | 0-N | it may contains a list of query parameters which the NRF used to get search result if such list of query parameters is different from received from the query request. |
| searchResultUrl | url | O | 0-1 | This IE may contain a url where the client can retrieve the complete search result |
| searchResultValidatyPeriod | integer | O | 0-1 | This IE may be present if the seachResultUri is present, and this IE indicates the time in seconds during which the search result remains in the NRF. |

The "foundNFInstances" attribute value may specify the total number of NF instance profiles that match the search criteria; the "UsedQueryParameters" values contains the query parameters of the search criteria; the "searchResultURL" value corresponds to the above described object identifier; and the "searchReultValidyPeriod" value corresponds to the above described object expiration information.

In some embodiments, generating discover response 503 comprises NRF 502 determining that a threshold specified in the discover request 501 would be exceeded if NRF 502 were to include in the discover response 504 all of the matching NF instance profiles, and comprises the NRF including in the discover response 503 the value specifying the total number of NF instance profiles that match the search criteria as a result of NRF 502 determining that the threshold would be exceeded. In some embodiments, NRF 502 determines whether the threshold would be exceeded by determining whether the total number of matching NF instance profiles exceeds the value of the "limit" attribute included in discover request 501 or determining, based on the value of the "max-payload-size", whether it must limit the number of NF instance profiles to include in the discover response 503.

In some embodiments, as a result of NRF 502 determining that the threshold would be exceeded, NRF 502 selects a subset of the matching NF instance profiles, includes this subset in the discover response 503 (e.g., in the nf instances array of the SearchResult included in the discover response 503), creates an object (e.g., a file, one or more database records, etc.), stores in the object at least the matching NF instance profiles that are not included in the subset included in the discover response 503; generates an object identifier identifying the created object, and includes the object identifier in the discover response 503 (e.g., in the searchResultUrl information element (IE) of the SearchResult object included in discover response 503).

Step s408 comprises NRF 502 transmitting the discover response to the requestor NF 504.

In embodiments in which discover response 503 comprises the object identifier, the process 400 may further include: NRF 502 receiving a request 505 (see FIG. 5) for the object (e.g., receiving an HTTP GET request for the object), wherein the request was transmitted by NF instance 504, and wherein the request includes the object identifier; and NRF 502 transmitting toward NF instance 504 a response 507 to the request 505. In some embodiments, the response 507 includes all of the NF instance profiles that match the search criteria but were not included in the discover response 503.

Figure 6:
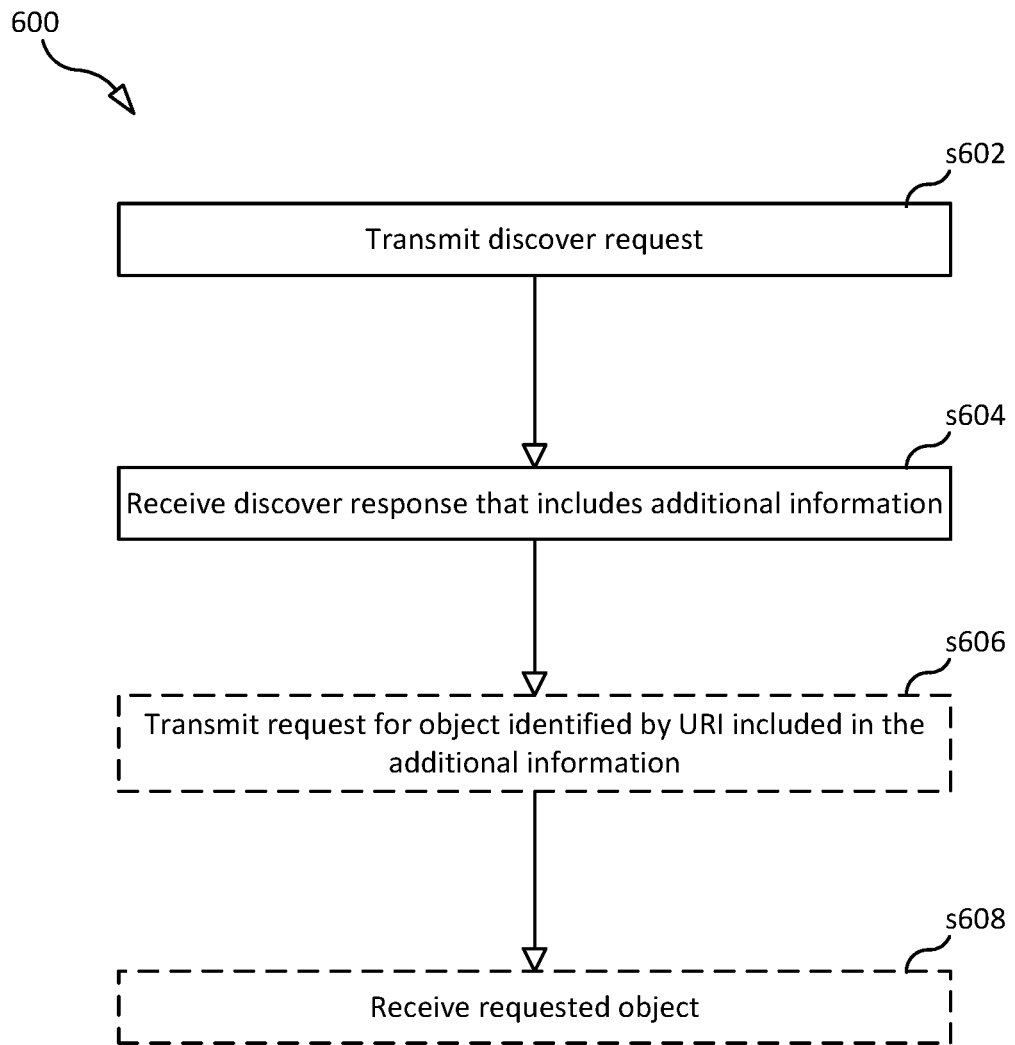
FIG. 6 is a flowchart illustrating a process according to an embodiment.

FIG. 6 is a flowchart illustrating a process 600 according to an embodiment. Process 600 may begin in step s602.

Step s602 comprises NF 504 transmitting discover request 501 towards NRF 502. Discover request 501 may include a limit attribute value and/or a maximum payload size attribute value. As noted above, discover request 501 may also include a set of query parameters. As further noted above, NRF 502 is configured to use a search criteria comprising a subset or a superset of the query parameters to search for and identify NF instance profiles that match the search criteria.

Step s604 comprises NF 504 receiving a discover response 503 transmitted by NRF 502 in response to request 501. Discover response 503 comprises zero or more NF instance profiles and further comprises any combination of one or more of the following: 1) the query parameters of the search criteria used by NRF 502 to search for and locate the NF instance profiles that match the search criteria (this set of query parameters may be a subset or a superset of the query parameters that were included in the discover request); 2) a value specifying the total number of NF instance profiles that match the search criteria; and 3) an identifier (e.g., URI) that the requestor NF 504 can use to obtain, at the least, the NF instance profiles that were not included in the discover response but that match the search criteria.

In embodiments in which discover response includes an object identifier (e.g., URI) that the requestor NF 504 can use to obtain the object identified by the object identifier, which object comprises, at the least, NF instance profiles that were not included in the discover response 503 but that match the search criteria, the process 600 may further include steps s606 and s608. In step s606, NF 504 transmits a request for the object 505 (see FIG. 5). The request 505 may be an HTTP GET request that comprises the object identifier. In some embodiments, the request is transmitted to NRF 502, but in other embodiments the request may be sent to a different server. In step s608, NF 504 receives a response 507 to the request 505, which response 507 includes, in one embodiment, all of the NF instance profiles that were not included in the discover response 503 but that match the search criteria. In other embodiments, the object includes all of the NF instance profiles that match the search criteria.

Figure 7:
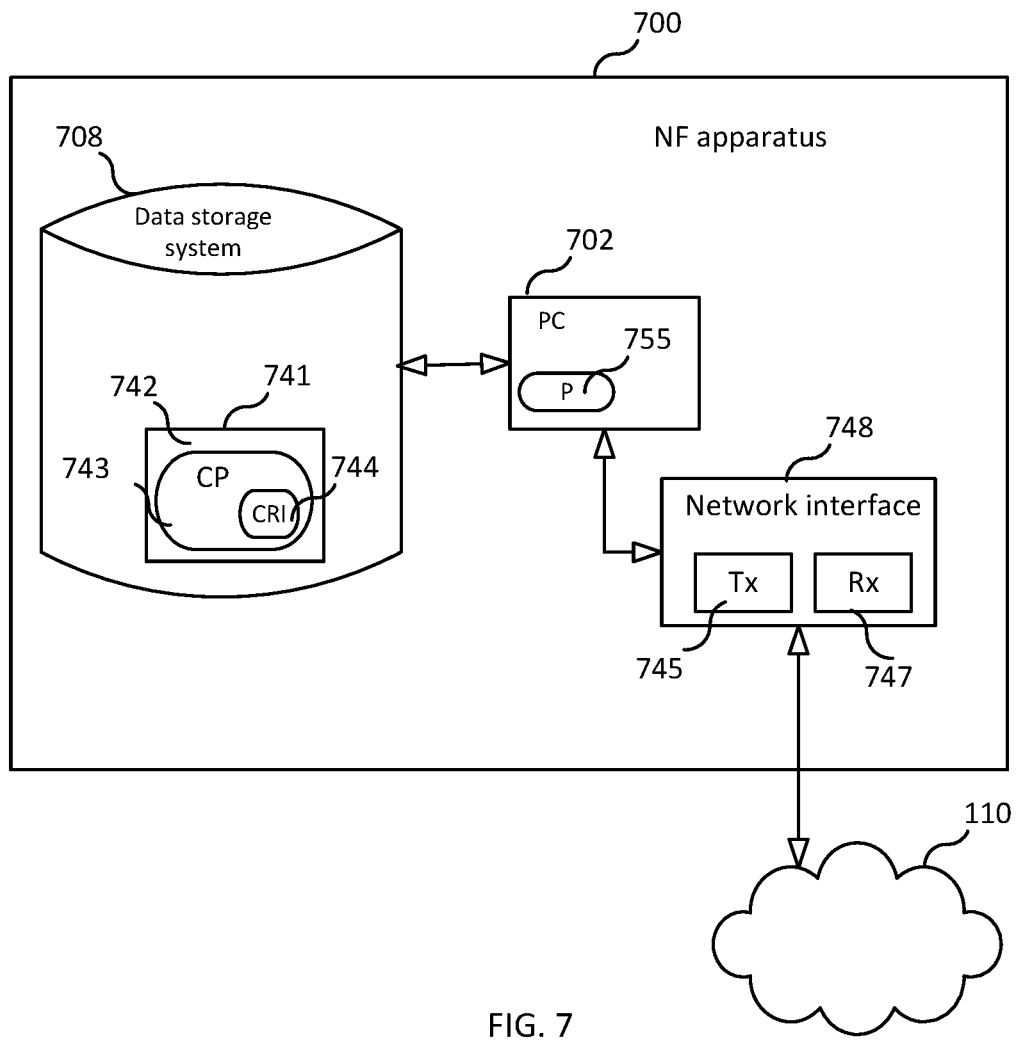
FIG. 7 is a block diagram of NF apparatus according to an embodiment.

FIG. 7 is a block diagram of an NF apparatus 700, according to some embodiments. NF apparatus implements an NF instance (e.g., NF instance 504 or an NRF instance, such as NRF 502). As shown in FIG. 7, NF apparatus 700 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 748 comprising a transmitter (Tx) 745 and a receiver (Rx) 747 for enabling NF apparatus 700 to transmit data to and receive data from other nodes connected to network 110 (e.g., an Internet Protocol (IP) network) to which network interface 748 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes NF apparatus 700 to perform steps described herein (e.g., steps described herein with reference to the flow charts). In other embodiments, NF apparatus 700 may be configured to perform steps described herein without the need for code. That is, for example, PC 702 may consist merely of one or more ASICs. Hence, the features of the embodiments described herein may be implemented in hardware and/or software.

Figure 8:
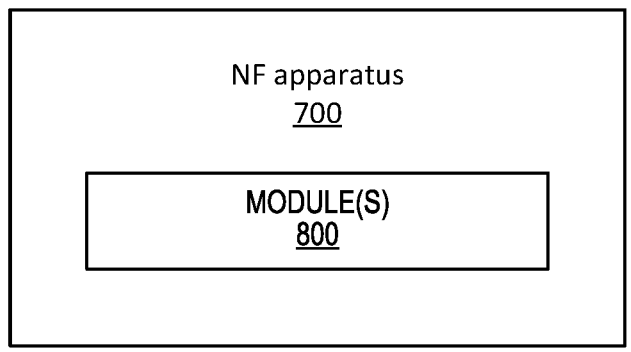
FIG. 8 is a block diagram of NF apparatus according to an embodiment.

FIG. 8 is a schematic block diagram of the NF apparatus 700 according to some other embodiments. The NF apparatus 700 includes one or more modules 800, each of which is implemented in software. The module(s) 800 provide the functionality of NF apparatus 700 described herein and, in particular, the functionality of the NFR 502 and/or NF 504 described herein (e.g., the steps described above, e.g., with respect to FIG. 4 and/or FIG. 6).

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

The invention claimed is:

1. A method in a network repository function (NRF) for providing a service discovery service to a network function (NF) instance, the method comprising:
   the NRF receiving a discover request transmitted by the NF instance, wherein the discover request comprises a set of one or more query parameters; and
   the NRF producing, based on a search criteria based on query parameters included in the discover request, a search result comprising NF instance profiles that match the search criteria;
   the NRF storing the search result comprising NF instance profiles that match the search criteria; and
   the NRF transmitting a discovery response comprising at least one of the NF instance profiles that match the search criteria, wherein
   the discover response further comprises an identifier for identifying the stored search result that comprises the NF instance profiles that match the search criteria, and
   the identifier enables the NF instance to obtain the stored search result.

2. The method of claim 1, wherein
   the method further comprises the NRF determining the total number of NF instance profiles that match the search criteria, and
   the discover response further comprises a value specifying the total number of NF instance profiles that match the search criteria.

3. The method of claim 1, wherein the discover request further comprises
   limit information indicating a maximum number of NF instance profiles to return, and/or
   a maximum payload information indicating maximum payload size.

4. The method of claim 1, wherein
   the search result is an object that contains each NF instance profile that matches the search criteria, and the identifier is a Uniform Resource Identifier (URI) that points to the object.

5. The method of claim 1, wherein
the method further comprises the NRF determining the total number of NF instance profiles that match the search criteria, and
the discover response further comprises information indicating that the total number of NF instance profiles that match the search criteria is higher than the number of NF instance profiles included in the array of NF instance profiles.

6. The method of claim 1, wherein
the method further comprises the NRF generating the discover response, and
generating the discover response comprises the NRF determining that a threshold specified in the discover request would be exceeded if the NRF were to include in the discover response all of the matching NF instance profiles.

7. The method of claim 6, wherein generating the discover response further comprises the NRF including in the discover response information indicating that the total number of NF instance profiles that match the search criteria is higher than the number of NF instance profiles included in the array of NF instance profiles as a result of the NRF determining that the threshold would be exceeded.

8. The method of claim 6, wherein determining whether the threshold would be exceeded comprises determining whether the total number of matching NF instance profiles exceeds the value of a limit attribute included in the discover request or determining, based on the value of a max-payload-size attribute, whether the NRF must limit the number of NF instance profiles to include in the discover response.

9. The method of claim 1, wherein the discover request is a Hypertext Transfer Protocol (HTTP) GET request that comprises a set of query parameters and a value to indicate to the NRF the NF instance is invoking a Discovery Service procedure.

10. The method of claim 1, wherein
the search criteria consists of the set of query parameters included in the discover request,
the search criteria consists of a subset of the set of query parameters included in the discover request, or
the search criteria comprises the set of query parameters included in the discover request and further comprises one or more additional query parameters.

11. The method of claim 1, wherein producing the search result comprises the NRF searching for NF instance profiles that match the search criteria.

12. The method of claim 1, further comprising:
the NRF receiving a request transmitted by the NF instance, wherein the request includes the identifier of the stored search result.

13. The method of claim 12, further comprising the NRF transmitting toward the NF instance a response to the request.

14. The method of claim 13, wherein the response includes all of the NF instance profiles that match the search criteria.

15. A method in a network repository function (NRF) for providing a service discovery service to a network function (NF) instance, the method comprising:
the NRF receiving a discover request transmitted by the NF instance, wherein the discover request comprises a set of one or more query parameters; and
the NRF transmitting, based on a search criteria based on query parameters included in the discover request, a discover response that comprises an array of NF instance profiles that match the search criteria, wherein
the method further comprises the NRF determining the total number of NF instance profiles that match the search criteria, and
the discover response further comprises information indicating that the total number of NF instance profiles that match the search criteria is higher than the number of NF instance profiles included in the array of NF instance profiles.

16. The method of claim 15, wherein
information indicating that the total number of NF instance profiles that match the search criteria is higher than the number of NF instance profiles included in the array of NF instance profiles comprises a value specifying the total number of NF instance profiles that match the search criteria.

17. The method of claim 16, wherein the discover request further comprises limit information indicating a maximum number of NF instance profiles to return and/or maximum payload information indicating a maximum payload size.

18. The method of claim 15, wherein
the method further comprises the NRF generating the discover response,
generating the discover response comprises the NRF determining that a threshold specified in the discover request would be exceeded if the NRF were to include in the discover response all of the matching NF instance profiles, and
generating the discover response further comprises the NRF including in the discover response information indicating that the total number of NF instance profiles that match the search criteria is higher than the number of NF instance profiles included in the array of NF instance profiles as a result of the NRF determining that the threshold would be exceeded.

19. The method of claim 15, wherein the discover response further comprises an identifier that the NF instance can use to obtain NF instance profiles that match the search criteria but were not included in the discover response to the NF instance.

20. The method of claim 19, wherein the identifier is an identifier of a stored search result comprising the NF instance profiles that match the search criteria but were not included in the discover response.

21. The method of claim 20, further comprising:
the NRF receiving a request transmitted by the NF instance, wherein the request includes the identifier of the stored search result, and
the NRF transmitting toward the NF instance a response to the request, wherein
the response includes all of the NF instance profiles that match the search criteria but were not included in the discover response.

22. A network function (NF) apparatus, the NF apparatus comprising:
a receiver for receiving a discover request transmitted by an NF instance, wherein the discover request comprises a set of one or more query parameters; and
processing circuitry for configuring the NF apparatus to:
produce, based on a search criteria based on query parameters included in the discover request, a search result comprising NF instance profiles that match the search criteria;

store the search result; and
transmit a discovery response comprising at least one of the NF instance profiles that match the search criteria, wherein
the discover response further comprises an identifier for identifying the stored search result and that enables the NF instance to obtain the search result.

* * * * *

UNITED STATES PATENT AND TRADEMARK OFFICE
CERTIFICATE OF CORRECTION

PATENT NO. : 11,968,273 B2
APPLICATION NO. : 17/598810
DATED : April 23, 2024
INVENTOR(S) : Yang et al.

Page 1 of 1

It is certified that error appears in the above-identified patent and that said Letters Patent is hereby corrected as shown below:

In the Specification

In Column 4, Line 64, delete "to many" and insert -- too many --, therefor.

In Column 5, Line 21, delete "nf instances" and insert -- nfinstances --, therefor.

In Column 5, Line 55, delete "now" and insert -- no --, therefor.

In Column 12, Line 29, delete "now" and insert -- no --, therefor.

In Columns 13 & 14, in TABLE 2-continued, under "Attribute name", Line 6, delete "searchResultValidatyPeriod" and insert -- searchResultValidityPeriod --, therefor.

In Columns 13 & 14, in TABLE 2-continued, under "Description", Line 27, delete "seachResultUri" and insert -- searchResultUrl --, therefor.

In Column 13, Line 37, delete ""searchReultValidyPeriod"" and insert -- "searchResultValidityPeriod" --, therefor.

In Column 13, Line 60, delete "nf instances" and insert -- nfinstances --, therefor.

Signed and Sealed this
Twenty-third Day of July, 2024

Katherine Kelly Vidal
*Director of the United States Patent and Trademark Office*